(12) United States Patent
Curry (10) Patent No.: US 10,855,160 B2
(45) Date of Patent: *Dec. 1, 2020

(54) REPELLING ELECTRIC GENERATOR

(71) Applicant: Charles Brent Curry, San Diego, CA (US)

(72) Inventor: Charles Brent Curry, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/397,873

(22) Filed: Apr. 29, 2019

(65) Prior Publication Data

US 2019/0252963 A1    Aug. 15, 2019

Related U.S. Application Data

(63) Continuation of application No. 14/941,367, filed on Nov. 13, 2015, now Pat. No. 10,320,275.

(51) Int. Cl.
*H02K 35/02* (2006.01)
*H02K 35/04* (2006.01)

(52) U.S. Cl.
CPC ............ *H02K 35/04* (2013.01); *H02K 35/02* (2013.01)

(58) Field of Classification Search
CPC .......... H02K 35/02; H02K 35/04; F03G 7/08
USPC .................. 310/13–17, 19–39; 290/1 R, 1 A
See application file for complete search history.

(56) References Cited

U.S. PATENT DOCUMENTS

| | | | |
|---|---|---|---|
| 7,394,183 B2 | 7/2008 | Ramer | |
| 7,501,726 B1 | 3/2009 | Waters et al. | |
| 7,692,340 B2 | 4/2010 | Waters et al. | |
| 7,902,698 B1 | 3/2011 | Waters | |
| 7,948,124 B1 | 5/2011 | Waters et al. | |
| 8,188,622 B1 | 5/2012 | Waters et al. | |
| 8,443,673 B2 | 5/2013 | Chisum et al. | |
| 8,497,606 B2 | 7/2013 | Rapoport | |
| 2007/0085425 A1 | 4/2007 | Hirashima | |
| 2008/0074083 A1 | 3/2008 | Yarger et al. | |
| 2009/0167033 A1 | 7/2009 | Rapoport | |

(Continued)

FOREIGN PATENT DOCUMENTS

| | | |
|---|---|---|
| GB | 2533943 A | 7/2016 |
| JP | 2007283201 A | 11/2007 |
| WO | WO-2014/006387 A1 | 1/2014 |

OTHER PUBLICATIONS

Suzuki, Machine Translation of JP2007283201, Nov. 2007.

(Continued)

*Primary Examiner* — Quyen P Leung
*Assistant Examiner* — Eric Johnson
(74) *Attorney, Agent, or Firm* — Mintz Levin Cohn Ferris Glovsky and Popeo, P.C.

(57) ABSTRACT

An electric generator includes a first magnet, a second magnet, and a first electric conductor. The first magnet may include a first surface. The second magnet may include a second surface having a same polarity as the first surface of the first magnet, wherein the first magnet and the second magnet are oriented such the first surface of the first magnet is opposite of the second surface of the second magnet. The first electric conductor may be positioned in a space between the first surface of the first magnet and the second surface of the second magnet such that the electric generator provides an electric current as a result of a movement of the second magnet relative to the first magnet.

9 Claims, 9 Drawing Sheets

(56) References Cited

U.S. PATENT DOCUMENTS

| | | |
|---|---|---|
| 2010/0013345 A1 | 1/2010 | Yarger et al. |
| 2010/0194117 A1 | 8/2010 | Pabon et al. |
| 2011/0140458 A1* | 6/2011 | Arnold .................. H02K 35/04 |
| | | 290/1 R |
| 2011/0266892 A1 | 11/2011 | Wauke |
| 2012/0169069 A1 | 7/2012 | Rapoport |

OTHER PUBLICATIONS

Howard, Bill, "Shock absorber generates electricity when it hits a bump," Extreme Tech, Jul. 15, 2011, printed from http://www.extremetech.com/extreme/90102-shock-absorber-generates-electricity-when-it-hits-a-bump, printed on Nov. 13, 2015 in 6 pages.

* cited by examiner

REPELLING ELECTRIC GENERATOR

RELATED APPLICATION

This application is a continuation application of U.S. patent application Ser. No. 14/941,367 filed Nov. 13, 2017, entitled "REPELLING ELECTRIC GENERATOR," the disclosure of which is incorporation herein by reference in its entirety.

BACKGROUND

1. Technical Field

The present disclosure relates generally to electric power generation, and more specifically to an electromagnetic power generator.

2. Related Art

An electric generator converts mechanical energy into electric energy. In a conventional electric generator, an electric conductor (e.g., wire coil) may be set in motion (e.g., rotation) with respect one or more permanent magnets having opposite polarity. The movement of the electric conductor relative to the permanent magnets creates a variance in the magnetic flux passing through the electric conductor thereby giving rise to an electric field (i.e., electric charges) within the electric conductor.

Drawing an electric load off a conventional electric generator causes an electric current to flow through the electric conductor and generates a magnetic field around the electric conductor. But the flow of the electric current hinders the motion of the electric conductor relative to the permanent magnets because the magnetic field that is generated by the flow of the electric current opposes the permanent magnets of the electric generator. In order to sustain the electric field and the flow of the electric current, a conventional electric generator requires an increasing amount of mechanical energy in order to maintain the motion of the electric conductor relative to the permanent magnets.

Due to a tendency to slow and lock during operation, conventional electric generators are generally deployed when decelerating and stopping a moving automobile (e.g., regenerative breaking system). However, a conventional electric generator is unable to effectively harness energy from jolts and vibrations experienced by a moving automobile. Such motions do not provide sufficient mechanical energy to overcome the opposing magnetic forces arising from the electric generator's usual operation and to prevent the electric generator from locking. Consequently, an abundant source of energy may be left untapped and wasted.

SUMMARY

A repelling electric generator is provided.

According to various embodiments, there is provided an electric generator. The electric generator may include a first magnet, a second magnet, and a first electric conductor.

The first magnet may include a first surface. The second magnet may include a second surface having a same polarity as the first surface of the first magnet, wherein the first magnet and the second magnet are oriented such the first surface of the first magnet is opposite of the second surface of the second magnet. The first electric conductor may be positioned between the first surface of the first magnet and the second surface of the second magnet such that the electric generator provides an electric current as a result of a movement of the second magnet relative to the first magnet.

According to various embodiments, there is provided a method for generating power. The method may include: providing an electric current as a result of a movement of a second magnet relative to a first magnet, wherein: the first magnet includes a first surface; the second magnet includes a second surface having a same polarity as the first surface of the first magnet, wherein the first magnet and the second magnet are oriented such the first surface of the first magnet is opposite of the second surface of the second magnet; and a first electric conductor is positioned between the first surface of the first magnet and the second surface of the second magnet.

According to various embodiments, there is provided an electric generator. The electric generator may include a first magnet, a second magnet, and an electric conductor.

The first magnet may include a first surface. The second magnet may include a second surface having a same polarity as the first surface of the first magnet, wherein the first magnet and the second magnet are oriented such the first surface of the first magnet is opposite of the second surface of the second magnet. The electric conductor may be positioned in a space between the first surface of the first magnet and the second surface of the second magnet such that the electric generator provides an electric current as a result of a movement of the electric conductor with respect to the first magnet and the second magnet.

Other features and advantages of the present disclosure should be apparent from the following description which illustrates by way of example aspects of the present disclosure.

BRIEF DESCRIPTION OF THE DRAWINGS

Aspects and features of the present disclosure will be more apparent by describing example embodiments with reference to the accompanying drawings, in which.

DETAILED DESCRIPTION

While a number of embodiments are described herein, these embodiments are presented by way of example only, and are not intended to limit the scope of protection. The apparatuses and methods described herein may be embodied in a variety of other forms. Furthermore, various omissions, substitutions, and changes in the form of the example apparatuses and methods described herein may be made without departing from the scope of protection.

Figure 1:
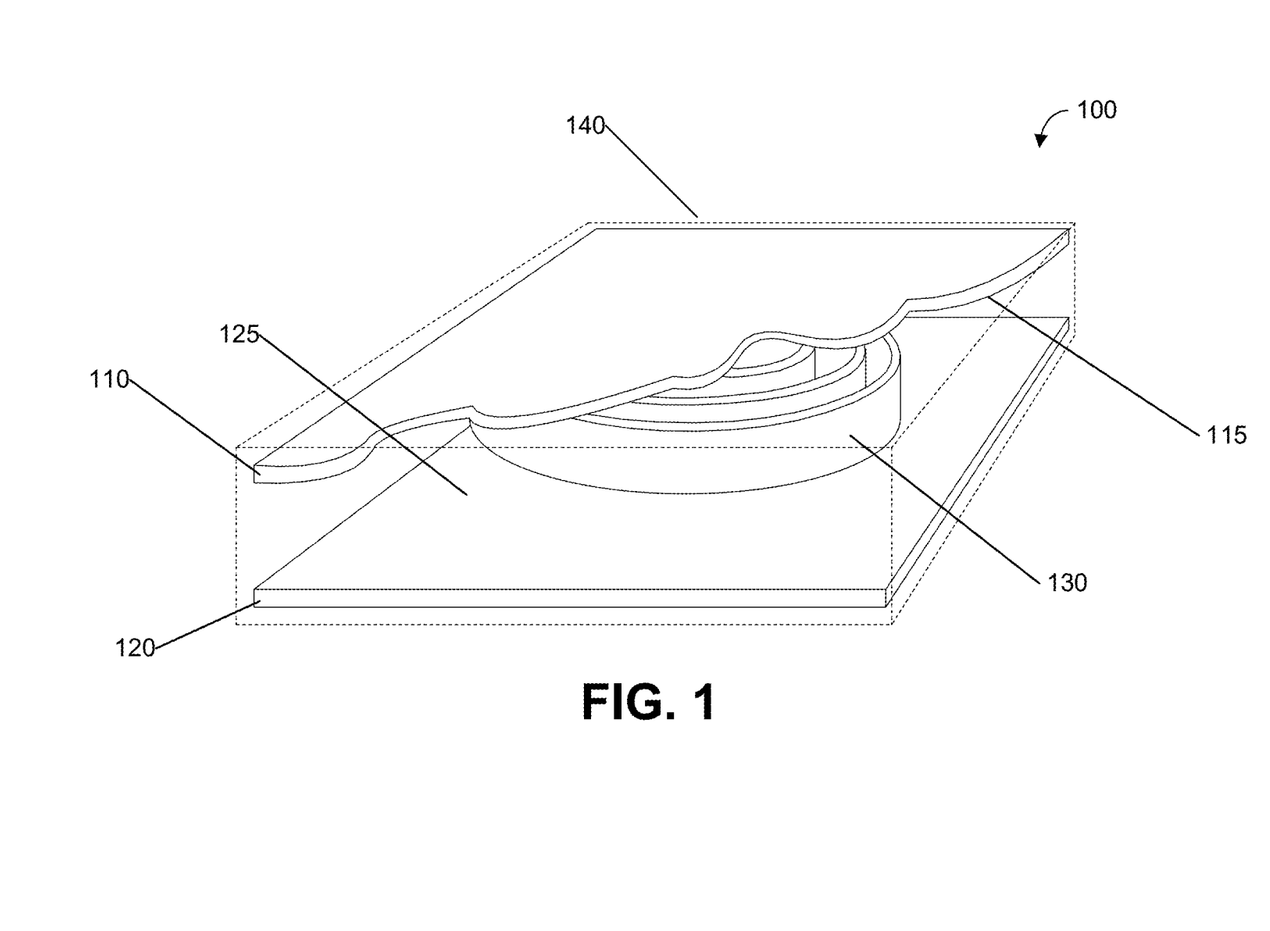
FIG. 1 illustrates an electric generator according to various embodiments.

FIG. 1 illustrates an electric generator 100 according to various embodiments. Referring to FIG. 1, in various embodiments, the electric generator 100 may include a first magnet 110, a second magnet 120, and an electric conductor 130.

The first magnet 110 may have a plurality of surfaces including, for example, but not limited to, a first surface 115. The second magnet may also have a plurality of surfaces including, for example, but not limited to, a second surface 125. In various embodiments, the first surface 115 and the second surface 125 may be substantially planar. In some embodiments, the first magnet 110 and the second magnet 120 may be sheet magnets. Although the first magnet 110 and the second magnet 120 are shown as rectangular sheet magnets, a person having ordinary skill in the art can appreciate that the first magnet 110 and/or the second magnet 120 may have a different shape and/or contours without departing from the scope of the present disclosure. Moreover, a person having ordinary skill in the art can appreciate that the first magnet 110 and/or the second magnet 120 may include an array of more than one magnet without departing from the scope of the present disclosure.

In various embodiments, the first magnet 110 may be substantially parallel to the second magnet 120. As such, the first surface 115 of the first magnet 110 may be oriented substantially parallel to the second surface 125 of the second magnet 120. The electric conductor 130 may be positioned in a space between the first magnet 110 and the second magnet 120. In various embodiments, the electric conductor 130 may be oriented on the horizontal plane substantially parallel to at least one of the first magnet 110 (i.e., the first surface 115) and the second magnet 120 (i.e., the second surface 125).

In some embodiments, one of the first magnet 110 and the second magnet 120 may be fixed. Accordingly, one of the first magnet 110 and the second magnet 120 may remain stationary with respect to the electric conductor 130. The other of the first magnet 110 and the second magnet 120 may be free to move with respect to the electric conductor 130 along one or more axes. As such, in some embodiments, the electric generator 100 may be configured to provide an electric current as a result of a movement of the one of the first magnet 110 and the second magnet 120 that is mobile relative to the one of the first magnet 110 and the second magnet 120 that is fixed.

In some embodiments, both the first magnet 110 and the second magnet 120 may be fixed. The electric conductor 130 may be free to move with respect to the first magnet 110 and the second magnet 120 along one or more axes. For example, in some embodiments, the electric conductor 130 may be suspended using a flexible suspension mechanism (e.g., expansion springs). As such, the electric generator 100 may be configured to provide an electric current as a result of a movement of the electric conductor 130 relative to the first magnet 110 and the second magnet 120.

The electric conductor 130 may be a wire coil. According to one exemplary embodiment, the electric conductor 130 may be a Brooks coil. However, a person having ordinary skill in the art can appreciate that any suitable electric conductor may be used without departing from the scope of the present inventive concept.

In various embodiments, the electric generator 100 may include a frame 140. The frame 140 may be constructed from any suitable material including, for example, but not limited to, aluminum (Al).

According to one exemplary embodiment, the first surface 115 of the first magnet 110 and the second surfaced 125 of the second magnet 120 may have a same polarity. Thus, the first magnet 110 and the second magnet 120 may mutually repel. For example, the first surface 115 and the second surface 125 may both be a north (or south) magnetic pole of the respective first magnet 110 and the second magnet 120.

Orientating the first magnet 110 and the second magnet 120 such that the first surface 115 of the first magnet 110 has a same polarity as the second surface 125 of the second magnet 120 that is opposite of the first surface 115 of the first magnet 110 prevents the electric generator 100 from slowing down and locking when an electric current is drawn from the electric conductor 130. Drawing an electric current from the electric generator 100 generates a magnetic field that does not oppose the first magnet 110 and the second magnet 120. As such, the electric generator 100 may continue to provide an electric current without requiring an increasing amount mechanical energy to maintain the motion of the electric conductor 130 relative to the first magnet 110 and the second magnet 120.

In various embodiments, the electric current that is output by the electric generator 100 may be an alternating current (AC). As such, in some embodiments, the electric generator 100 may be coupled with one or more bridge rectifiers (not shown) configured to convert the AC output current from the electric generator 100 to a direct current (DC) output current.

In various embodiments, the frequency of the electric current output by the electric generator 100 may vary. For example, jolts and vibrations may occur sporadically and thus lead to an inconsistent output frequency. As such, in some embodiments, the electric generator 100 may be coupled with one or more capacitors (e.g., inline high capacitance) (not shown) in order to level the frequency of the output current.

Although the electric generator 100 is shown to include the first magnet 110, the second magnet 120, and the electric conductor 130, a person having ordinary skill in the art can appreciate that the electric generator 100 can include additional magnets and/or electric conductors without departing from the scope of the present inventive concept. For example, in some embodiments, the electric generator 100 may include a first plurality of magnets forming a magnet shell having a three-dimensional shape. The electric generator 100 may further include a second plurality of magnets forming a magnetic core having a corresponding three-dimensional shape. One or more electric conductors (e.g., wire coils) may be positioned in a space between the magnetic shell and the magnetic core.

Figure 2A:
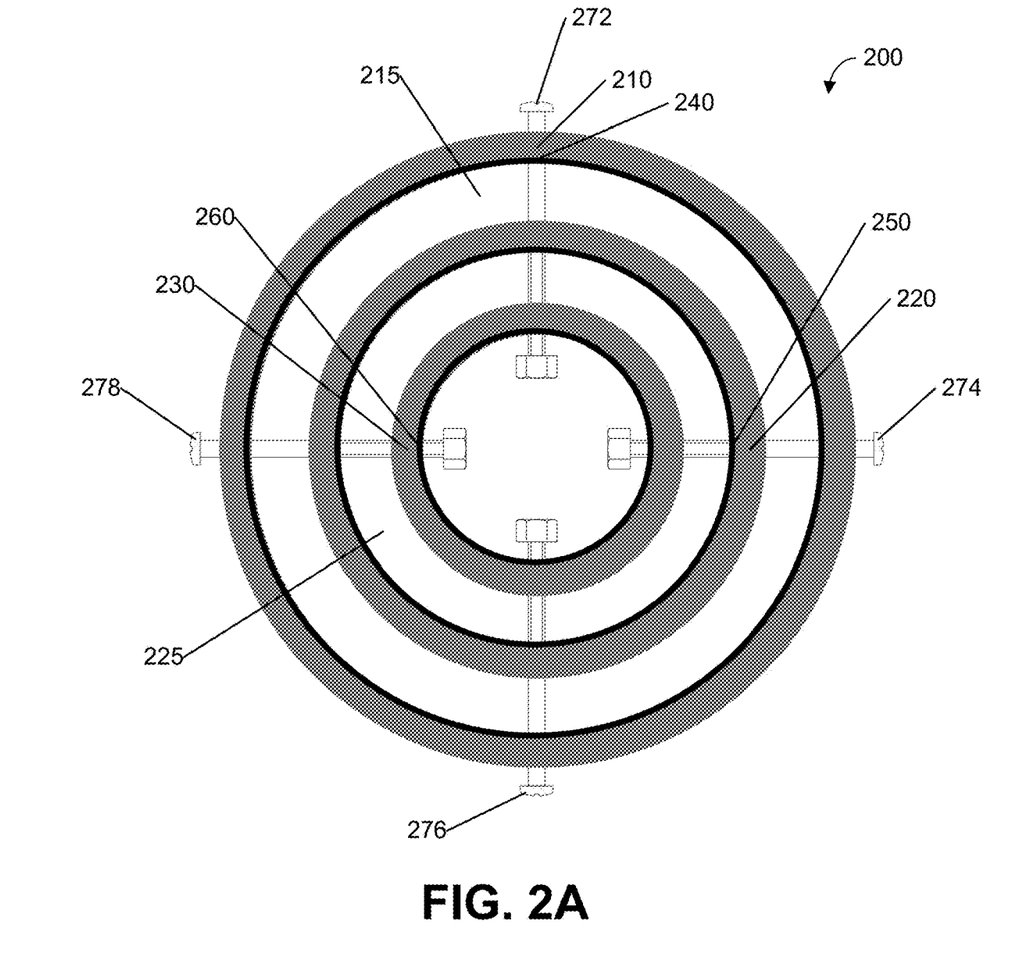
FIG. 2A illustrates a top view of a horizontal cross section of an electric conductor according to various embodiments.

FIG. 2A illustrates a top view of a horizontal cross section an electric conductor 200 according to various embodiments. Referring to FIGS. 1 and 2A, in various embodiments, the electric conductor 200 may implement the electric conductor 130.

In various embodiments, the electric conductor 200 may include a plurality of coils including, for example, but not limited to, a first coil 210, a second coil 220, and a third coil 230. According to one exemplary embodiment, the first coil 210, the second coil 220, and the third coil 230 may each include a plurality of windings. The plurality of windings may be constructed from a conductive material including, for example, but not limited to, copper (Cu).

In various embodiments, the electric conductor 200 may further include a plurality of cores including, for example, but not limited to, a first core 240, a second core 250, and a third core 260. In one exemplary embodiment, the first core 240, the second core 250, and the third core 260 may be constructed from an insulating (i.e., non-conductive) material. For example, in some embodiments, the first core 240, the second core 250, and the third core 260 may each be constructed plastic.

In some embodiments, the plurality of windings included in each of the first coil 210, the second coil 220, and the third coil 230 may encircle the first core 240, the second core 250, and the third core 260 along a horizontal axis to form the respective first coil 210, the second coil 220, and the third coil 230. As such, the plurality of windings included in each of the first coil 210, the second coil 220, and the third coil 230 may be horizontal with respect to one or more external magnets (e.g., the first magnet 110 and the second magnet 120). However, a person having ordinary skill in the art the plurality of windings may encircle the respective first core 240, the second core 250, and the third core 260 in a different manner (e.g., along a vertical axis) without departing from the scope of the present disclosure.

Advantageously, the inclusion of multiple coils (e.g., the first coil 210, the second coil 220, and the third coil 230) maximizes an amount of current output by an electric generator (e.g., the electric generator 100) that includes the electric conductor 200. In one exemplary embodiment, the number of coils (and corresponding cores) included in the electric conductor 200 may be maximized with respect to a dimensions of the magnets (e.g., the first magnet 110 and the second magnet 120) surrounding the electric conductor 200.

As shown in FIG. 2A, in some embodiments, each of the first coil 210, the first core 240, the second coil 220, the second core 250, the third coil 230, and the third core 260 may be substantially circular (i.e., at a respective horizontal cross section). However, a person having ordinary skill in the art can appreciate that each of the first coil 210, the first core 240, the second coil 220, the second core 250, the third coil 230, and the third core 260 may have a different shape (e.g., equilateral polygon) without departing from the scope of the present disclosure.

According to one exemplary embodiment, the first coil 210, the first core 240, the second coil 220, the second core 250, the third coil 230, and the third core 260 may be positioned in a nested configuration. In various embodiments, the first coil 210, the first core 240, the second coil 220, the second core 250, the third coil 230, and the third core 260 may be positioned with air gaps between each successive coil and core. For example, as shown in FIG. 2A, a first air gap 215 may be present between the first core 240 and the second coil 220 and a second air gap 225 may be present between the second core 250 and the third coil 230.

As shown in FIG. 2A, the third coil 230 and the third core 260 may have relatively smaller dimensions (e.g., diameters) than the second coil 220 and the second core 250. As such, the third coil 230 and the third core 260 may be positioned concentrically within the second coil 220 and the second core 250. The second coil 220 and the second core 250 may have relatively smaller dimensions (e.g., diameters) than the first coil 210 and the first core 240. Thus, the second coil 220 and the second core 250 may be positioned concentrically within the first coil 210 and the first core 240. A person having ordinary skill in the art can appreciate that the first coil 210, the first core 240, the second coil 220, the second core 250, the third coil 230, and the third core 260 may be positioned in a different configuration without departing from the scope of the present disclosure.

In various embodiments, the first coil 210, the first coil 210, the first core 240, the second coil 220, the second core 250, the third coil 230, and the third core 260 may be secured in an appropriate configuration (e.g., concentric) using one or more fasteners including, for example, but not limited to, a first fastener 272, a second fastener 274, a third fastener 276, and a fourth fastener 278. In some embodiments, the first fastener 272, the second fastener 274, the third fastener 276, and the fourth fastener 278 may be screws. A person having ordinary skill in the art can appreciate that any appropriate fastener can be used without departing from the scope of the present disclosure. Furthermore, a person having ordinary skill in the art can appreciate that a different number of fasteners may be used without departing from the scope of the present disclosure.

Figure 2B:
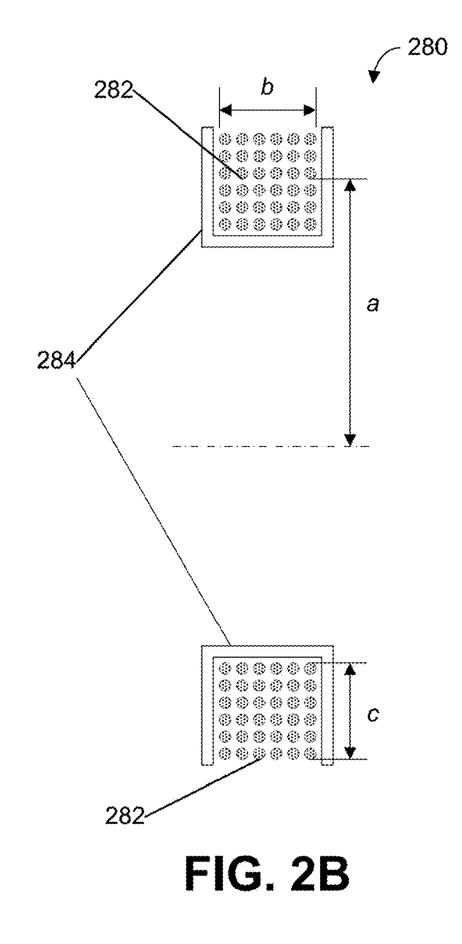
FIG. 2B illustrates a vertical cross section of a coil according to various embodiments.

FIG. 2B illustrates a vertical cross section of a coil 280 according to various embodiments. Referring to FIGS. 2A-B, in various embodiments, the coil 280 may include windings 282 (e.g., Cu) around a core 284 (e.g., plastic). In various embodiments, the coil 280 may implement one or more of the first coil 210, the second coil 220, and the third coil 230.

As shown in FIG. 2B, the coil 280 may include one or more dimensions including, for example, but not limited to, a mean radius a of the windings 282, a width b of the windings 282, and a height c of the windings 282. An inductance L of the coil 280 (e.g., as measured in henrys (H)) may be determined based on following equation:

$$L = 4 \times 10^{-7} \pi a N^2 ((0.5 + S_1/12) ln(8/S_1) - 0.84834 + 0.2041 S_1)$$

where $S_1 = (c/2a)^2$ and N is a number of turns in the windings 282.

According to one exemplary embodiment, the coil 280 may be a Brooks coil. As such, one or more dimensions of the coil 280 may be optimized in order to maximize the inductance L of the coil 280. For example, to maximize the inductance L of the coil 280, the mean radius a of the windings 282 may be substantially equal to 3c/2.

Figure 3:
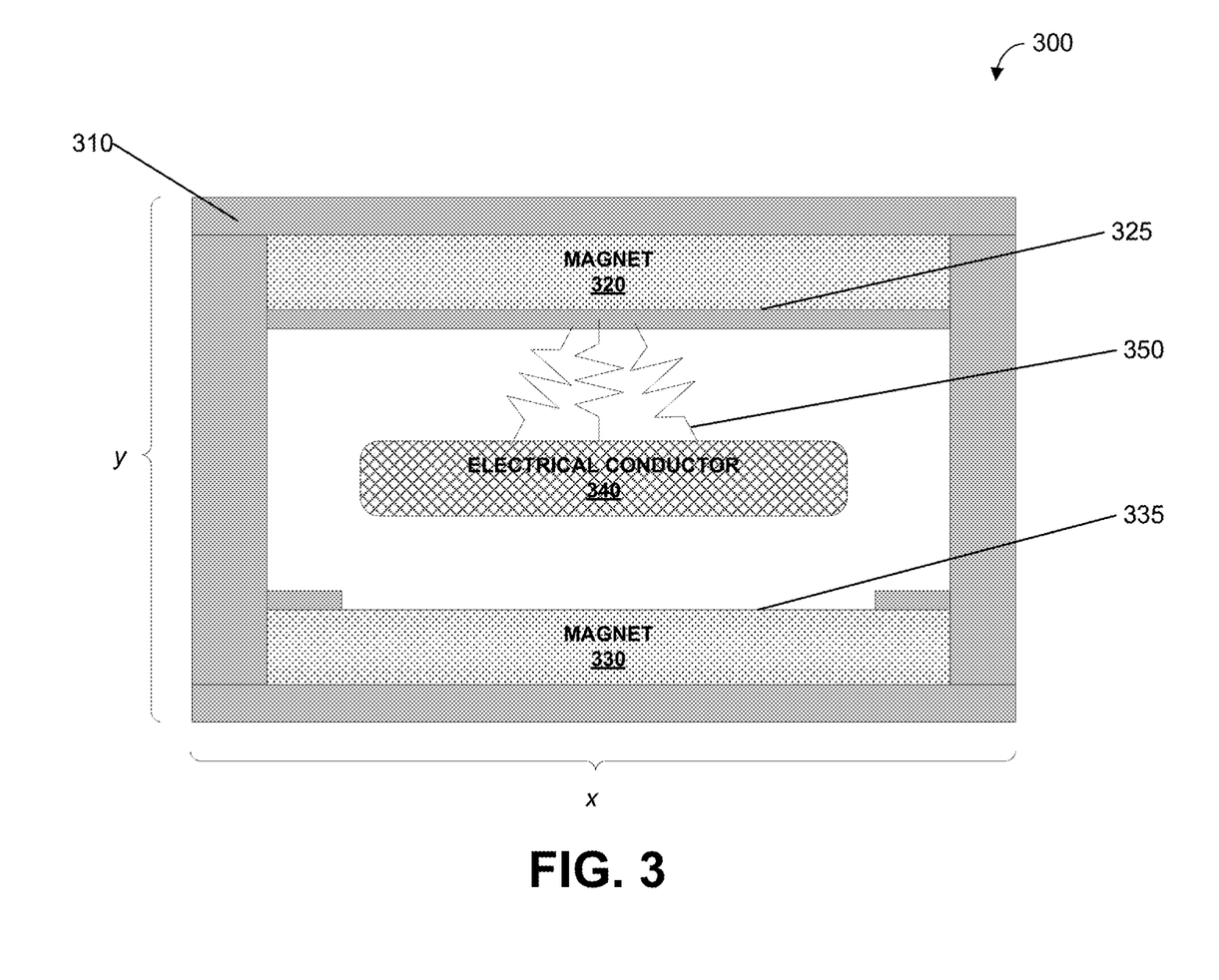
FIG. 3 illustrates a cross section of an electric generator according to various embodiments.

FIG. 3 illustrates a cross section of an electric generator 300 according to various embodiments. Referring to FIG. 3, the electric generator 300 includes a frame 310, a first magnet 320, a second magnet 330, and an electric conductor 340.

In various embodiments, the first magnet 320 and the second magnet 330 may be fixed. For example, as shown in FIG. 3, the first magnet 320 and the second magnet 330 may be held in place by the frame 310. In various embodiments, the first magnet 320 and the second magnet 330 may be oriented such that a first surface 325 of the first magnet 320 has a same polarity as a second surface 335 of the second magnet 330 that is opposite to the first surface 325. The first magnet 320 may be oriented substantially parallel to the second magnet 330. As such, the first surface 325 of the first magnet 320 may be oriented substantially parallel to the second surface 335 of the second magnet 330.

In some embodiments, the first magnet 320 and the second magnet 330 may be sheet magnets. However, a person having ordinary skill in the art can appreciate that the first magnet 320 and/or the second magnet 330 may include an array of multiple magnets without departing from the scope of the present disclosure.

In various embodiments, the electric conductor 340 may be positioned in a space between the first magnet 320 and the second magnet 330. The electric conductor 340 may be oriented substantially parallel to at least one of the first magnet 320 (i.e., the first surface 325) and the second magnet 330 (i.e., the second surface 335).

In various embodiments, the electric conductor 340 may be suspended using a suspension mechanism 350. In one exemplary embodiment, the suspension mechanism 350 may be a flexible suspension mechanism including, for example, but not limited to, one or more expansion springs. As such, the electric conductor 340 may be free to move along one or more axes with respect to the first magnet 320 and the second magnet 330.

In various embodiments, the electric generator 300 may provide an electric current as a result of a movement of the electric conductor 340 with respect to the first magnet 320 and the second magnet 330. Although the electric conductor 340 is shown to be suspended from a portion of the frame 310 adjacent to the first magnet 320, a person having ordinary skill in the art can appreciate that the electric conductor 340 may be suspended from a different surface within the frame 310 of the electric generator 300 without departing from the scope of the present disclosure.

The movement of the electric conductor 340 with respect to the first magnet 320 and the second magnet 330 generates an electric field within the electric conductor 340. Advantageously, the first magnet 320 and the second magnet 330 are oriented such that the first surface 325 of the first magnet 320 has a same polarity as the second surface 335 of the second magnet 330 that is opposite of the first surface 325 of the first magnet 320. Thus, drawing an electric current from the electric generator 300 creates a magnetic field around the electric conductor 340 that does not oppose the first magnet 320 and the second magnet 330. The electric generator 300 may continue to provide an electric current without requiring an increasing amount of mechanical energy to maintain the motion of electric conductor 340 relative to the first magnet 320 and the second magnet 330.

The electric generator 300 may have a horizontal dimension x and a vertical dimension y. According to one exemplary embodiment, a size of the electric generator 300 may be minimized in at least one dimension. For example, the vertical dimension y of the electric generator 300 may be minimized. As such, in some embodiments, the vertical dimension y of the electric generator 300 may be less than the horizontal dimension x of the electric generator 300.

In various embodiments, the electric generator 300 may be coupled with one or more bridge rectifiers (not shown) configured to convert an AC output current from the electric generator 300 to a DC output current. In various embodiments, the electric generator 300 may also be coupled with one or more capacitors (e.g., inline high capacitance) (not shown) in order to level the frequency of the output current.

Figure 4:
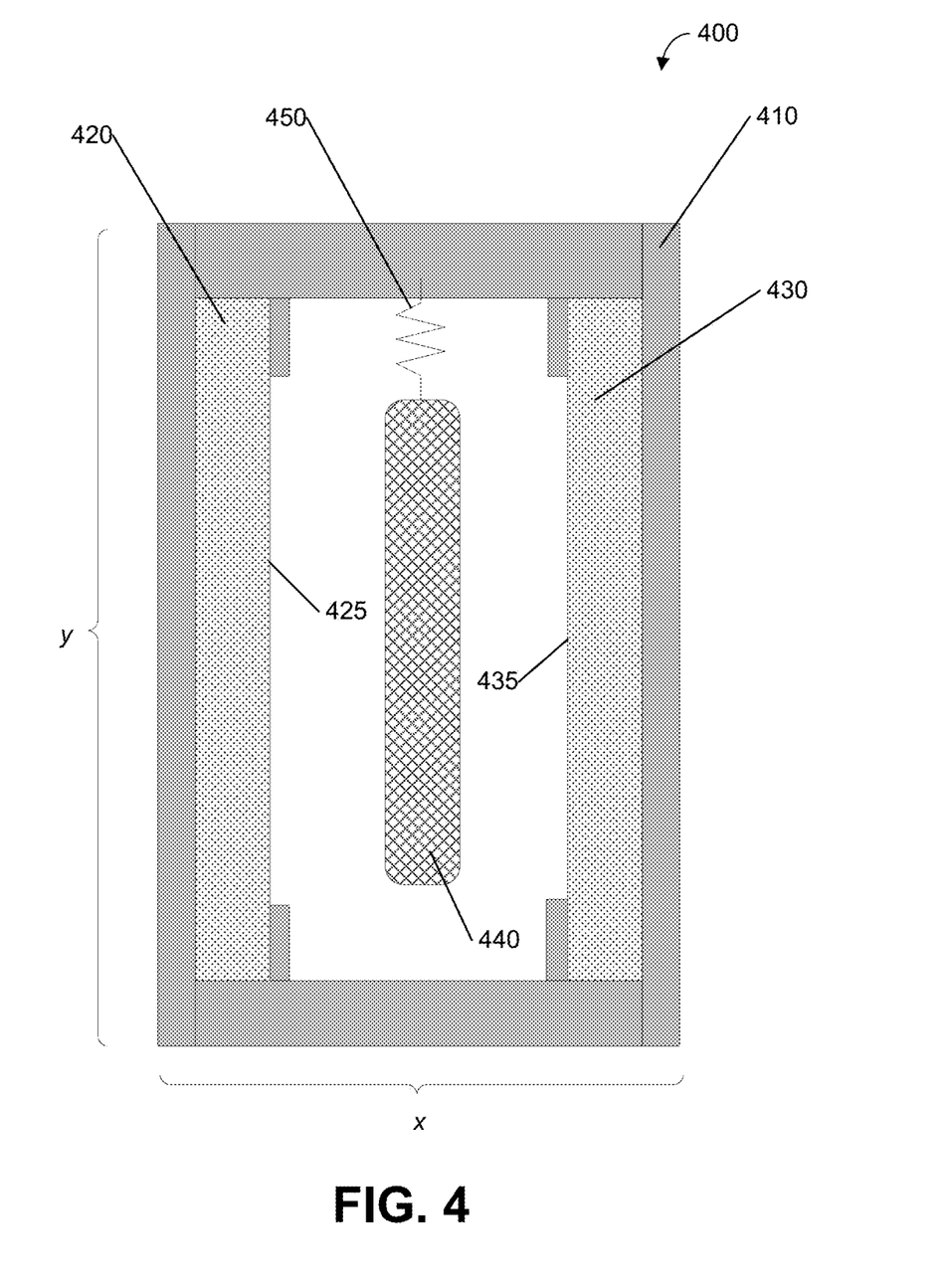
FIG. 4 illustrates a cross section of an electric generator according to various embodiments.

FIG. 4 illustrates a cross sectional view of an electric generator 400 according to various embodiments. Referring to FIG. 4, the electric generator 400 may include a frame 410, a first magnet 420, a second magnet 430, and an electric conductor 440.

In various embodiments, the first magnet 420 and the second magnet 430 may be fixed. For example, the first magnet 420 and the second magnet 430 may be held in place by the frame 410. The first magnet 420 and the second magnet 430 may be oriented such that a first surface 425 of the first magnet 420 and a second surface 435 of the second magnet 430 opposite to the first surface 425 have a same polarity. The first magnet 420 (i.e., the first surface 425) may be oriented to be substantially parallel to the second magnet 430 (i.e., the second surface 435).

In some embodiments, the first magnet 420 and the second magnet 430 may be sheet magnets. However, a person having ordinary skill in the art can appreciate that the first magnet 420 and/or the second magnet 430 may include an array of multiple magnets without departing from the scope of the present disclosure.

In various embodiments, the electric conductor 440 may be suspended in a space between the first surface 425 of the first magnet 420 and the second surface 435 of the second magnet 430. The electric conductor 440 may be oriented to be substantially parallel to at least one of the first magnet 420 (i.e., the first surface 425) and the second magnet 430 (i.e., the second surface 435).

The electric conductor 440 may be suspended between the first magnet 420 and the second magnet 430 using the suspension mechanism 450. In one exemplary embodiment, the suspension mechanism 450 may be a flexible suspension mechanism including, for example, but not limited to, one or more expansion springs. In some embodiments, the electric conductor 440 may be suspended from a side portion of the frame 410 and may be free to move along one or more axes with respect to the first magnet 420 and the second magnet 430.

In various embodiments, the electric generator 400 may have a horizontal dimension x and a vertical dimension y. According to one exemplary embodiment, a size of the electric generator 400 may be minimized in at least one dimension. For example, the horizontal dimension x of the electric generator 400 may be minimized. As such, in some embodiments, the horizontal dimension x of the electric generator 400 may be less than the vertical dimension y of the electric generator 400.

In various embodiments, the electric generator 400 may be coupled with one or more bridge rectifiers (not shown) configured to convert an AC output current from the electric generator 400 to a DC output current. In various embodiments, the electric generator 400 may also be coupled with one or more capacitors (e.g., inline high capacitance) (not shown) in order to level the frequency of the output current.

Figure 5:
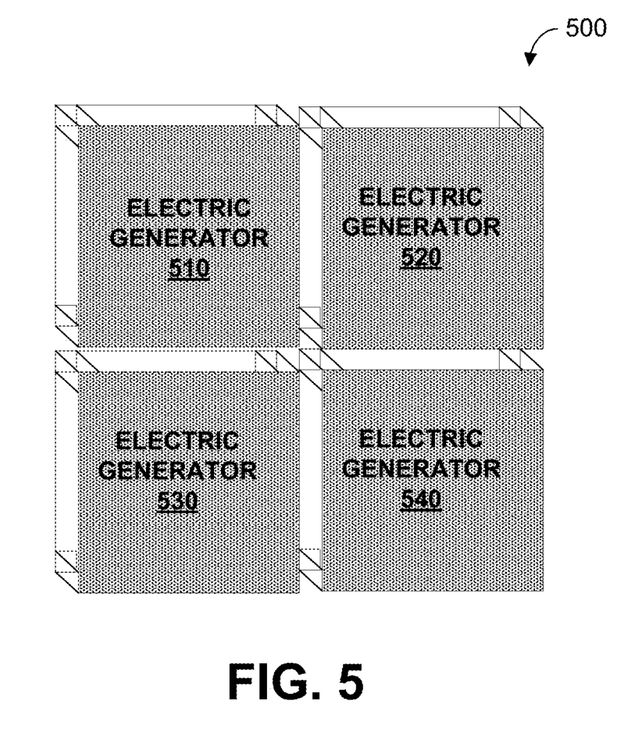
FIG. 5 illustrates an electric generator array according to various embodiments.

FIG. 5 illustrates an electric generator array 500 according to various embodiments. Referring to FIGS. 3-5, the electric generator array 500 may include a plurality of electric generators including, for example, but not limited to, a first electric generator 510, a second electric generator 520, a third electric generator 530, and a fourth electric generator 540.

In various embodiments, the size of the electric generator array 500 may be minimized in at least one dimension. As such, in various embodiments, at least one of the first electric generator 510, the second electric generator 520, the third electric generator 530, and the fourth electric generator 540 may be implemented using the electric generator 300. Alternately or in addition, at least one of the first electric generator 510, the second electric generator 520, the third electric generator 530, and the fourth electric generator 540 may be implemented using the electric generator 300.

Although the electric generator array 500 is shown to include the first electric generator 510, the second electric generator 520, the third electric generator 530, and the fourth electric generator 540, a person having ordinary skill in the art can appreciate that the electric generator array 500 may include a different number of electric generators without departing from the scope of the present disclosure. Moreover, the electric generator array 500 may include a plurality of generators in a different array than shown without departing from the scope of the present disclosure.

Figure 6:
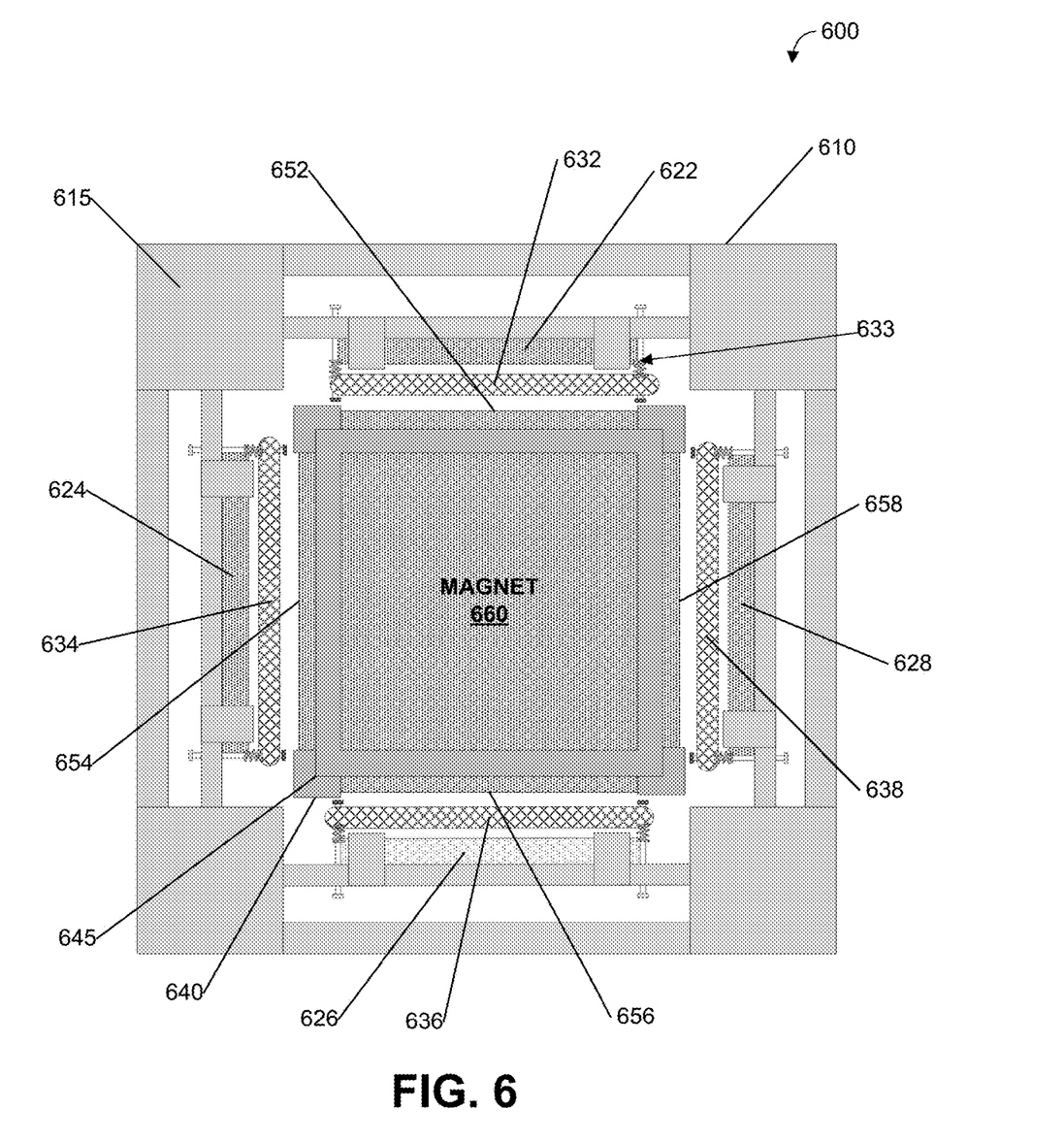
FIG. 6 illustrates a side view of an electric generator according to various embodiments.

FIG. 6 illustrates a side view of an electric generator 600 according to various embodiments. Referring to FIG. 6, in various embodiments, the electric generator 600 may include a magnetic shell 610 that encloses a magnetic core 640.

According to one exemplary embodiment, each of the magnetic shell 610 and the magnetic core 640 may be a same three-dimensional shape. For example, the magnetic shell 610 and the magnetic core 640 may both be a regular polyhedron. As shown in FIG. 6, in some embodiments, the magnetic shell 610 and the magnetic core 640 may both be a cube.

In various embodiments, the magnetic shell 610 may include a first frame 615. The first frame 615 may be constructed from a suitable material including, for example, but not limited to, aluminum (Al). The magnetic shell 610 may include a plurality of magnets corresponding to each side of the three-dimensional shape. In various embodiments, each of the plurality of magnets may be held in place by the first frame 615. For example, the magnetic shell 610 may include a first magnet 622, a second magnet 624, a third magnet 626, a fourth magnet 628, a fifth magnet (not shown), and a sixth magnet (not shown). The first magnet 622, the second magnet 624, the third magnet 626, the fourth magnet 628, the fifth magnet (not shown), and the sixth magnet (not shown) may correspond to the six sides of a cube.

In some embodiments, the first magnet 622, the second magnet 624, the third magnet 626, the fourth magnet 628, the fifth magnet (not shown), and the sixth magnet (not shown) may be sheet magnets. However, a person having ordinary skill in the art can appreciate that one or more of the first magnet 622, the second magnet 624, the third magnet 626, the fourth magnet 628, the fifth magnet (not shown), and the sixth magnet (not shown) may include an array of multiple magnets without departing from the scope of the present disclosure.

In various embodiments, the magnetic core 640 may include a second frame 645. The second frame 645 may be constructed from a suitable material including, for example, but not limited to, aluminum (Al). The magnetic core 640 may include a plurality of magnets corresponding to each side of the three-dimensional shape. For example, the magnetic core 640 may include a seventh magnet 652, an eighth magnet 654, a ninth magnet 656, a tenth magnet 658, an eleventh magnet 660, and a twelfth magnet (not shown). The seventh magnet 652, the eighth magnet 654, the ninth magnet 656, the tenth magnet 658, the eleventh magnet 660, and the twelfth magnet (not shown) may correspond to the six sides of a cube.

In some embodiments, the seventh magnet 652, the eighth magnet 654, the ninth magnet 656, the tenth magnet 658, the eleventh magnet 660, and the twelfth magnet (not shown) may be sheet magnets. However, a person having ordinary skill in the art can appreciate that one or more of seventh magnet 652, the eighth magnet 654, the ninth magnet 656, the tenth magnet 658, the eleventh magnet 660, and the twelfth magnet (not shown) may include an array of multiple magnets without departing from the scope of the present disclosure.

According to one exemplary embodiment, surfaces of the magnets oriented towards the interior of the magnetic shell 610 are oriented to repel the surfaces of the magnets oriented towards the exterior of the magnetic core 640. For example, in various embodiments, a surface of the first magnet 622 oriented towards the interior of the magnetic shell 610 and facing the magnetic core 640 may have a same polarity as a surface of the seventh magnet 652 oriented towards the exterior of the magnetic core 640. As such, the magnetic core 640 may be suspended within the magnetic shell 610 and free to move along one or more axes as a result of the repulsion between the magnetic shell 610 and the magnetic core 640.

In various embodiments, the electric generator 600 may include a plurality of electric conductors including, for example, but not limited to, a first electric conductor 632, a second electric conductor 634, a third electric conductor 636, a fourth electric conductor 638, a fifth electric conductor (not shown), and a sixth electric conductor (not shown). One or more of the first electric conductor 632, the second electric conductor 634, the third electric conductor 636, the fourth electric conductor 638, the fifth electric conductor (not shown), and the sixth electric conductor (not shown) may be a wire coil (e.g., the coil 280).

Each of the first electric conductor 632, the second electric conductor 634, the third electric conductor 636, the fourth electric conductor 638, the fifth electric conductor (not shown), and the sixth electric conductor (not shown) may be positioned in a space between corresponding magnets of the magnetic shell 610 and magnetic core 640. For example, the first electric conductor 632 may be positioned between a space between the first magnet 622 of the magnetic shell 610 and the seventh magnet 652 of the magnetic core 640.

In various embodiments, the first electric conductor 632, the second electric conductor 634, the third electric conductor 636, the fourth electric conductor 638, the fifth electric conductor (not shown), and the sixth electric conductor (not shown) may be secured to the first frame 615 of the magnetic shell 610. As such, the first electric conductor 632, the second electric conductor 634, the third electric conductor 636, the fourth electric conductor 638, the fifth electric conductor (not shown), and the sixth electric conductor (not shown) may remain stationary with respect to the magnetic shell 610.

Alternately, in some embodiments, one or more of the first electric conductor 632, the second electric conductor 634, the third electric conductor 636, the fourth electric conductor 638, the fifth electric conductor (not shown), and the sixth electric conductor (not shown) may be suspended using any suitable suspension mechanism (e.g., one or more expansion springs). Thus, a person having ordinary skill in the art can appreciate that one or more of the first electric conductor 632, the second electric conductor 634, the third electric conductor 636, the fourth electric conductor 638, the fifth electric conductor (not shown), and the sixth electric conductor (not shown) may remain free to move along one or more axes with respect to magnetic shell 610 and the magnetic core 640 without departing from the scope of the present disclosure.

In various embodiments, the electric generator 600 may provide an electric current as a result of a movement of the magnetic core 640 with respect to the magnetic shell 610, the first electric conductor 632, the second electric conductor 634, the third electric conductor 636, the fourth electric conductor 638, the fifth electric conductor (not shown), and the sixth electric conductor (not shown). For example, the magnetic core 640 may move along one or more axes when the electric generator 600 is subject to jolts and/or vibrations.

Drawing an electric current from the electric generator 600 may give rise to a magnetic field in each of the first electric conductor 632, the second electric conductor 634, the third electric conductor 636, the fourth electric conductor 638, the fifth electric conductor (not shown), and the sixth electric conductor (not shown). The surfaces of the magnets oriented toward the interior of the magnetic shell 610 have a same polarity as the surfaces of the magnets oriented towards the exterior of the magnetic core 640. As such, the magnetic fields arising from the flow of currents through the electric conductors do not oppose the magnets that are included in the magnetic shell 610 and in the magnetic core 640. Advantageously, the magnetic core 640 may remain free to move along one or more axes (e.g., as a result of jolts and/or vibrations) when an electric current is drawn from the electric generator 600.

Although the electric generator 600 is shown to be a cube, a person having ordinary skill in the art can appreciate that the electric generator 600 can be a different shape (e.g., another regular polyhedron) without departing from the scope of the present disclosure.

Figure 7A:
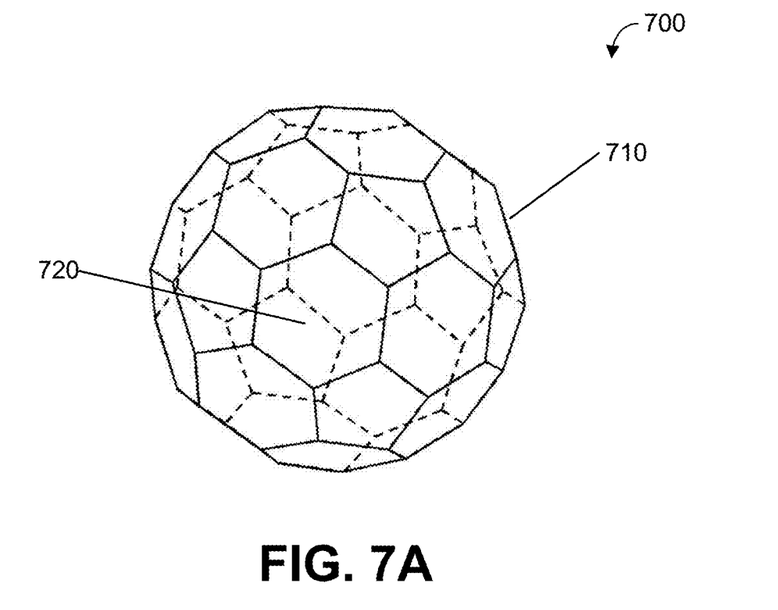
FIG. 7A illustrates an electric generator according to various embodiments.

FIG. 7A illustrates an electric generator 700 according to various embodiments. Referring to FIG. 7A, in various embodiments, the electric generator 700 may include a magnetic shell 710 that is in a shape of a truncated icosahedron having a plurality of (i.e., thirty-two) magnetic surfaces including, for example, but not limited to, a surface 720. Each of the magnetic surfaces of the magnetic shell 710 (e.g., the surface 720) may include a magnet (e.g., sheet magnet) or an array of magnets. The magnetic shell 710 may include a frame (e.g., aluminum (Al)) adapted to hold the magnets and/or array of magnets in the shape of the truncated icosahedron.

The electric generator 700 may further include a magnetic core (not shown). According to one exemplary embodiment, the magnetic core (not shown) may also be in a shape of a truncated icosahedron having a plurality of (i.e., thirty-two) magnetic surfaces. Each of the magnetic surfaces of the magnetic core (not shown) may include a magnet (e.g., sheet magnet) or an array of magnets. The magnetic shell (not shown) may include a frame adapted to hold the magnets and/or array of magnets in the shape of a truncated icosahedron.

The electric generator 700 may include a plurality of electric conductors (not shown). For example, in various embodiments, the electric generator 700 may include a plurality of wire coils (e.g., Brooks coil). The plurality of electric conductors (not shown) may be positioned in a space between the magnetic shell 710 and the magnetic core (not shown). For example, in various embodiments, an electric conductor may be positioned in a space between each magnet of the magnetic shell 710 and a corresponding magnet of the magnetic core (not shown).

In various embodiments, the surfaces of magnets oriented towards the interior of the magnetic shell 710 may have a same polarity as the surfaces of magnets oriented towards the exterior of the magnetic core (not shown). As such, the magnetic core (not shown) may be suspended within the magnetic shell 710 and free to move along one or more axes as a result of the repulsion between the magnetic shell 710 and the magnetic core (not shown).

In various embodiments, the electric generator 700 may provide an electric current as a result of a movement of the magnetic core (not shown) with respect to the magnetic shell 710. For example, the magnetic core (not shown) may move along one or more axes when the electric generator 700 is subject to jolts and/or vibrations.

Drawing an electric current from the electric generator 700 may give rise to a magnetic field in each of the plurality of electric conductors (not shown). The surfaces of the magnets oriented toward the interior of the magnetic shell 710 have a same polarity as the surfaces of the magnets oriented towards the exterior of the magnetic core (not shown). As such, the magnetic fields arising from the flow of currents through the electric conductors do not oppose the magnets that are included in the magnetic shell 710 and in the magnetic core (not shown). Advantageously, the magnetic core (not shown) may remain free to move along one or more axes (e.g., as a result of jolts and/or vibrations) when an electric current is drawn from the electric generator 700.

Although the electric generator 700 is shown to be a truncated icosahedron, a person having ordinary skill in the art can appreciate that the electric generator 700 can be a different shape (e.g., another regular polyhedron) without departing from the scope of the present disclosure.

Figure 7B:
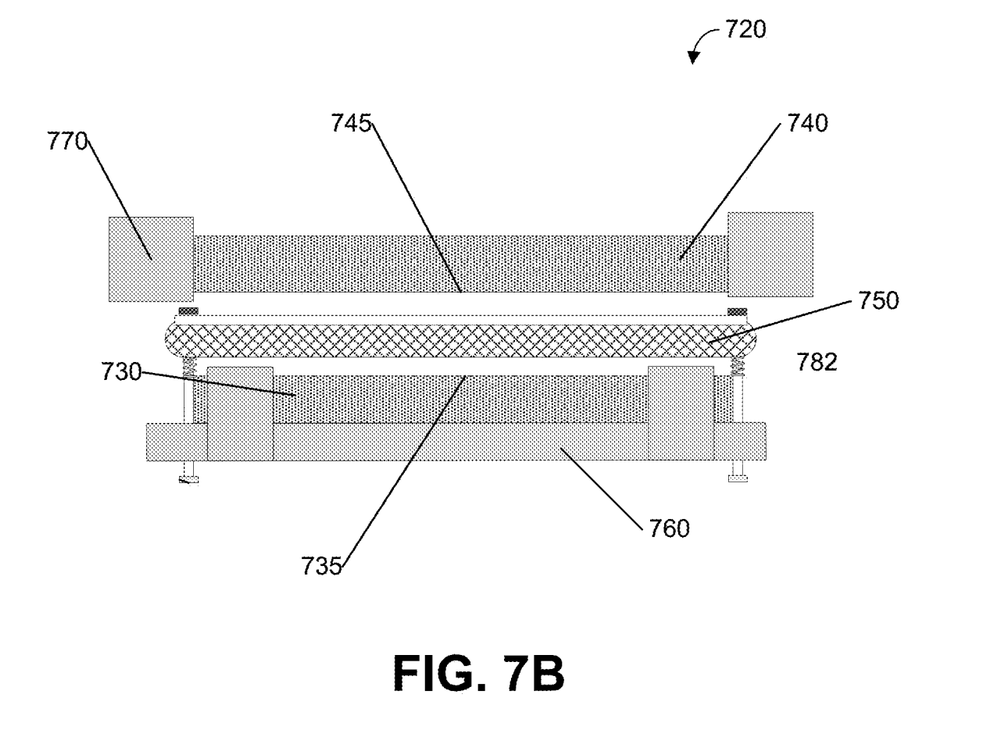
FIG. 7B illustrates a cross section through a surface of an electric generator according to various embodiments.

FIG. 7B illustrates a cross section through the surface 720 of the electric generator 700 according to various embodiments. Referring to FIG. 7B, through the surface 720, the electric generator 700 may include a first magnet 730, a second magnet 740, and an electric conductor 750.

In various embodiments, the first magnet 730 may be part of the magnetic shell 710 of the electric generator 700. The first magnet 730 may be held in place by a first frame 760 of the magnetic shell 710. For example, the first frame 760 may be adapted to hold a plurality of magnets including the first magnet 730 in a shape of a truncated icosahedron.

In various embodiments, the second magnet 740 may be part of the magnetic core and may be held in place by a second frame 770 of the magnetic core. For example, the second frame 770 may be adapted to hold a plurality of magnets including the second magnet 740 in a shape of a truncated icosahedron.

In various embodiments, the electric conductor 750 may be positioned in a space between the first magnet 730 and the second magnet 740. The electric conductor 750 may include one or more wire coils. In one exemplary embodiment, the electric conductor 750 may include one or more Brooks coils.

In some embodiments, the electric conductor 750 may be secured to the first frame 760 of the magnetic shell 710 using one or more fasteners including, for example, but not limited to, a first fastener 782 and a second fastener 784. As such, the electric conductor 750 may be fixed and remain stationary with respect to the first magnet 730 of the magnetic shell 710. Alternately, the electric conductor 750 may be suspended (e.g., from the first frame 760 of the magnetic shell 710) using a suspension mechanism (e.g., one or more expansion springs) and remain free to move along one or more axes with respect to the first magnet 730 of the magnetic shell 710 and the second magnet 740 of the magnetic core.

According to one exemplary embodiment, the surfaces of magnets oriented towards the interior of the magnetic shell 710 may have a same polarity as the surfaces of magnets oriented towards the exterior of the magnetic core. As shown in FIG. 7B, a first surface 735 of the first magnet 730 of the magnetic shell 710 may have a same polarity as a second surface 745 of the second magnet 740 of the magnetic core. The magnetic core may be suspended within the magnetic shell 710 and free to move along one or more axes as a result of the repulsion between the magnetic shell 710 and the magnetic core including, for example, but not limited to, a repulsion between the first magnet 730 and the second magnet 740.

In various embodiments, the electric generator 700 may provide an electric current as a result of a movement of the magnetic core (not shown) with respect to the magnetic shell 710. For example, the second magnet 740 of the magnetic core may move along one or more axes with respect to the first magnet 730 of the magnetic shell 710 when the electric generator 700 is subject to jolts and/or vibrations.

Drawing an electric current from the electric generator 700 may give rise to a magnetic field in each of the plurality of electric conductors including, for example, but not limited to, the electric conductor 750. The first surface 735 of the first magnet 730 have a same polarity as the second surface 745 of the second magnet 740 that is opposite of the first surface 735. As such, the magnetic field arising from the flow of current through the electric conductor 750 does not oppose the first magnet 730 of the magnetic shell 710 and the second magnet 740 of the magnetic core. Advantageously, the second magnet 740 of the magnetic core may remain free to move along one or more axes (e.g., as a result of jolts and/or vibrations) when an electric current is drawn from the electric generator 700.

Figure 8:
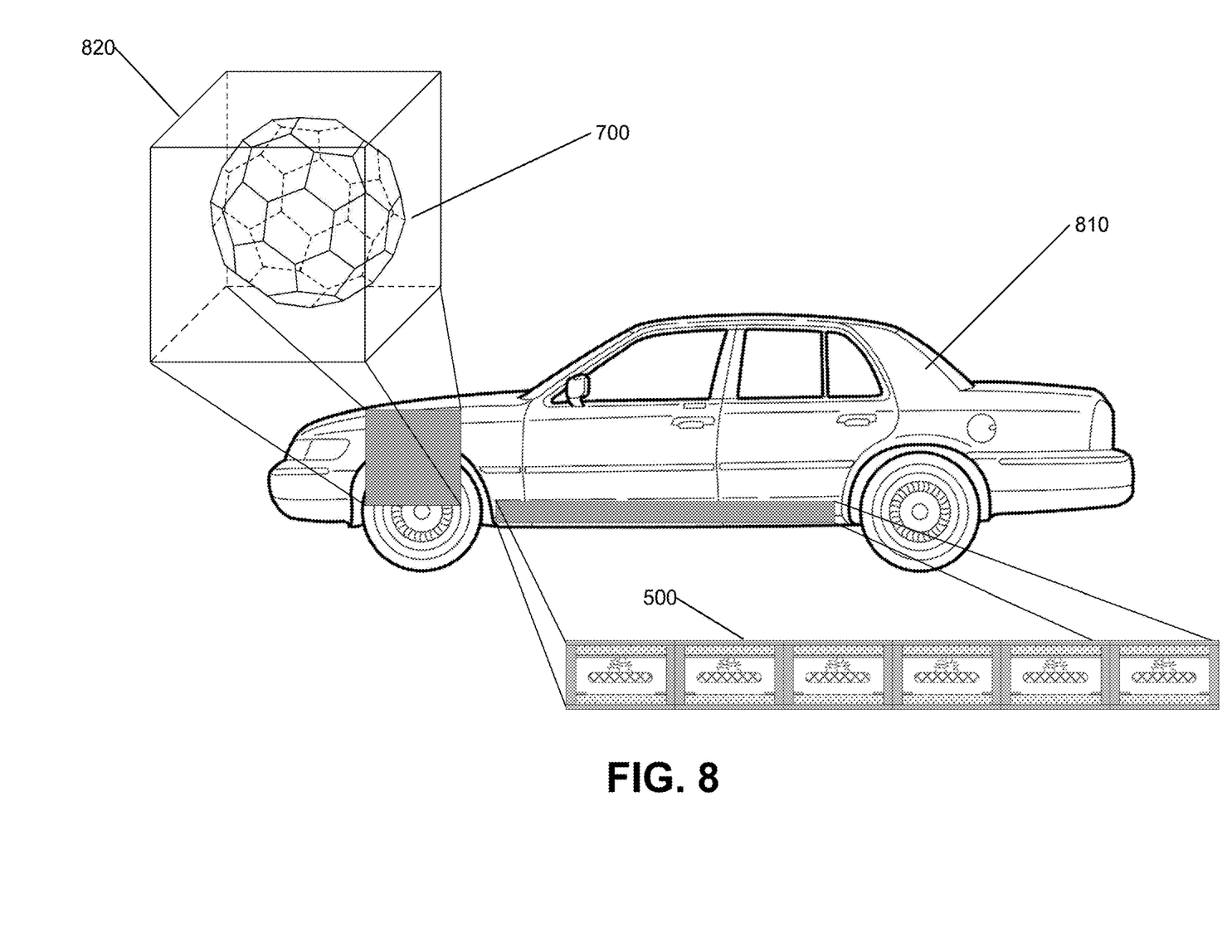
FIG. 8 illustrates applications for one or more electric generators according to various embodiments.

FIG. 8 illustrates applications for one or more electric generators according to various embodiments. Referring to FIGS. 1-8, in various embodiments, one or more electric generators may be adapted for installation in an automobile 810.

In various embodiments, the electric generator 700 may be adapted for installation at or near a suspension system of the automobile 810. As shown in FIG. 8, in some embodiments, the electric generator 700 may be enclosed in a case 820. According to one exemplary embodiment, the case 820 may provide stability to the electric generator 700.

Alternately or in addition, the electric generator array 500 may be adapted for installation on the automobile 810. For example, in some embodiments, the electric generator array 500 may be installed inside the door panels and near the wheelbase of the automobile 810. In various embodiments, the electric generator array 500 may include one or more of the electric generator 300 having a minimized vertical dimension and the electric generator 400 having a minimized horizontal dimension.

Figure 9:
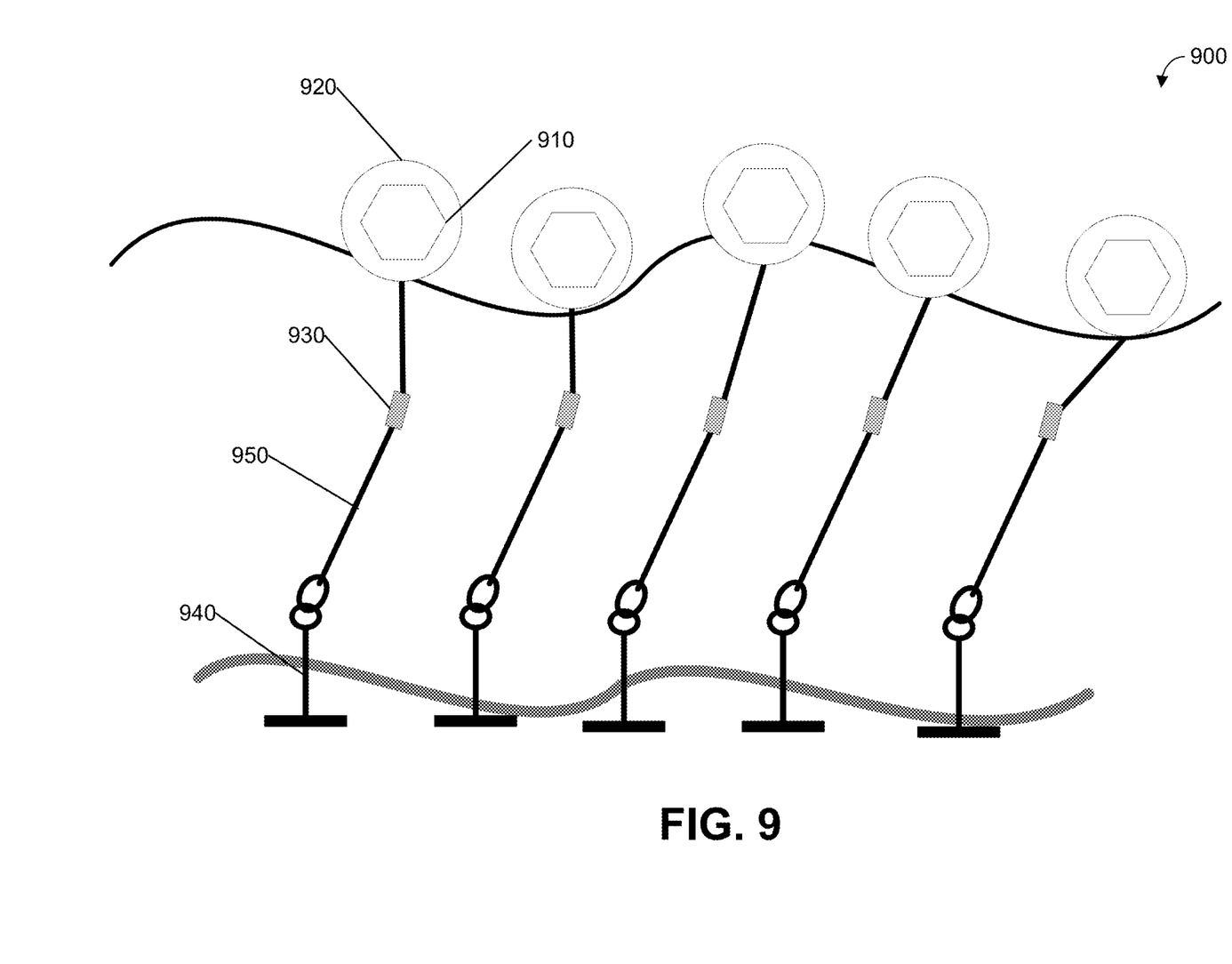
FIG. 9 illustrates an electric generator array according to various embodiments.

FIG. 9 illustrates an electric generator array 900 according to various embodiments. Referring to FIGS. 6, 7A-B, and 9, the electric generator array 900 may include a plurality of electric generators including, for example, but not limited to, an electric generator 910. In various embodiments, the electric generator 910 may be implemented using the electric generator 600 or the electric generator 700.

According to one exemplary embodiment, the electric generator 910 may be adapted to be buoyant. For example, in some embodiments, the electric generator array 900 may be deployed in a body of water and the electric generator 910 may be adapted to provide an electric current when subject to movements in the water. As such, the electric generator 910 may be coupled a flotation device 920 (e.g., buoy) allowing the electric generator 910 to float in one or more mediums including, for example, but not limited to, water. In some embodiments, the electric generator 910 may be further coupled with a weight 930 and an anchor 940 using a cable 950.

A person having ordinary skill in the art can appreciate that the electric generator 910 may be adapted to be buoyant using a different mechanism (e.g., balloon) and/or float in a different medium (e.g., air) without departing from the scope of the present disclosure.

Although the present disclosure provides certain example embodiments and applications, other embodiments and applications that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An electric generator, comprising:
   a magnetic shell comprising a first frame and a first plurality of magnets secured to the first frame, each of the first plurality of magnets forming a side of a first polyhedron comprising the magnetic shell, and each of the first plurality of magnets having a first surface oriented towards an interior of the magnetic shell;
   a magnetic core disposed inside the magnetic shell, the magnetic core comprising a second frame and at least a second plurality of magnets secured to the second frame, each of the second plurality of magnets forming a side of a second polyhedron comprising the magnetic core, each of the second plurality of magnets being paired with one of the plurality of first magnets to form a plurality of pairs of magnets, each of the second plurality of magnets having a second surface having oriented towards an exterior of the magnetic core and opposite of the first surface comprising each of the first plurality of magnets, the first surface and the second surface being planar, the first surface being oriented parallel to the second surface, and the first surface and the second surface being configured to repel one another; and
   a plurality of electric conductors disposed in a space between the magnetic shell and the magnetic core, each of the plurality of electric conductors being disposed between one of the plurality of pairs of magnets formed by the first plurality of magnets and the second plurality of magnets, and each of the plurality of electric conductors being configured to provide an electric current as a result of a movement of the magnetic core relative to the magnetic shell.

2. The electric generator of claim 1, wherein each of the plurality of electric conductors is suspended from the first frame of the magnetic shell by one or more fasteners.

3. The electric generator of claim 1, wherein the first polyhedron and the second polyhedron each comprise a regular polyhedron.

4. The electric generator of claim 1, wherein the first polyhedron and the second polyhedron each comprise an icosahedron.

5. The electric generator of claim 1, wherein at least one of the plurality of electric conductors comprises a first wire coil and a second wire coil, and wherein the first wire coil is nested inside the second wire coil.

6. The electric generator of claim 5, wherein at least one of the first wire coil and the second wire coil comprises a Brooks coil.

7. The electric generator of claim 1, wherein each of the plurality of electric conductors is suspended in the space between the magnetic shell and the magnetic core.

8. The electric generator of claim 1, wherein the first polyhedron and the second polyhedron each comprise a cube.

9. A method for generating power, comprising:
   providing an electric current as a result of a movement of a magnetic core relative to a magnet shell, wherein:
   the magnetic shell comprising a first frame and a first plurality of magnets secured to the first frame, each of the first plurality of magnets forming a side of a first polyhedron comprising the magnetic shell, and each of the first plurality of magnets having a first surface oriented towards an interior of the magnetic shell the magnetic core disposed inside the magnetic shell, the magnetic core comprising a second frame and at least a second plurality of magnets secured to the second frame, each of the second plurality of magnets forming a side of a second polyhedron comprising the magnetic core, each of the second plurality of magnets being paired with one of the plurality of first magnets to form a plurality of pairs of magnets, each of the second plurality of magnets having a second surface oriented towards an exterior of the magnetic core and opposite of the first surface comprising each of the first plurality of magnets, the first surface and the second surface being planar, the first surface being oriented parallel to the second surface, and the first surface and the second surface being configured to repel one another; and the electric current is generated by a plurality of first electric conductors disposed in a space between the magnetic shell and the magnetic core, each of the plurality of electric conductors being disposed between one of the plurality of pairs of magnets formed by the first plurality of magnets and the second plurality of magnets.

* * * * *